United States Patent
Choi et al.

(10) Patent No.: US 8,879,158 B2
(45) Date of Patent: Nov. 4, 2014

(54) META MATERIAL AND METHOD OF MANUFACTURING THE SAME

(75) Inventors: Choon Gi Choi, Daejeon (KR); Sang Soon Oh, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 827 days.

(21) Appl. No.: 13/013,092

(22) Filed: Jan. 25, 2011

(65) Prior Publication Data
US 2012/0013989 A1 Jan. 19, 2012

(30) Foreign Application Priority Data
Jul. 15, 2010 (KR) .................. 10-2010-0068543

(51) Int. Cl.
G02B 3/00 (2006.01)
H01Q 15/00 (2006.01)
G02B 1/00 (2006.01)
B82Y 20/00 (2011.01)

(52) U.S. Cl.
CPC ............ G02B 1/007 (2013.01); H01Q 15/0086 (2013.01); G02B 2207/101 (2013.01); B82Y 20/00 (2013.01)
USPC .......................................................... 359/642

(58) Field of Classification Search
CPC ....... G02B 3/00; G02B 27/0025; H02J 5/005; H01F 38/14; H01Q 1/243; H01Q 1/38
USPC ........................... 359/642; 307/104; 343/702
See application file for complete search history.

(56) References Cited

U.S. PATENT DOCUMENTS

| 4,772,506 A * | 9/1988 | Siol et al. ........................ 428/212 |
| 6,985,118 B2 | 1/2006 | Zarro et al. |
| 7,538,946 B2 | 5/2009 | Smith et al. |
| 2004/0001029 A1 * | 1/2004 | Parsche et al. ................. 343/866 |
| 2005/0221128 A1 * | 10/2005 | Kochergin ....................... 428/824 |
| 2006/0092079 A1 * | 5/2006 | de Rochemont ......... 343/700 MS |

FOREIGN PATENT DOCUMENTS

KR 10-2008-0102205 11/2008

OTHER PUBLICATIONS

Michael S. Rill, et al., "Photonic metamaterials by direct laser writing and silver chemical vapour deposition", Nature materials, vol. 7, pp. 543-546 (2008).
Young-Woo Son, "Graphene", Physics & Hightechnology, pp. 40-43 (2008) (http://www.kps.or.kr/storage/webzine_uploadfiles/1076_article.pdf).

* cited by examiner

Primary Examiner — James Greece
(74) Attorney, Agent, or Firm — Rabin & Berdo, P.C.

(57) ABSTRACT

Provided are a meta material and a method of manufacturing the same. The meta material comprises: a substrate; at least one conductive nano pattern patterned on the substrate and having a size with a negative refractive index in a predetermined electromagnetic wavelength band; and a dielectric layer covering the conductive nano patterns.

4 Claims, 19 Drawing Sheets

META MATERIAL AND METHOD OF MANUFACTURING THE SAME

CROSS-REFERENCE TO RELATED APPLICATIONS

This U.S. non-provisional patent application claims priority under 35 U.S.C. §119 of Korean Patent Application No. 10-2010-0068543, filed on Jul. 15, 2010, the entire contents of which are hereby incorporated by reference.

BACKGROUND OF THE INVENTION

The present invention disclosed herein relates to a meta material and a method of manufacturing the same, and more particularly, to a meta material comprising a nano pattern structure of a negative reflectance in a natural state and a method of manufacturing the same.

Typically, materials existing in the natural world may reflect electromagnetic waves in a direction that may be expected through Snell's law. That is, most of the natural materials have positive reflectance. On the contrary, a meta material has an artificially-synthesized structure and may have nonexistent negative reflectance in the natural world. The meta material may overcome the diffraction limit of an optical microscope and thus may be diversely used for high resolution imaging techniques, ultra-fine pattern processing techniques, and instrumentation technologies. Recently, researches for this meta material is being actively in process.

SUMMARY OF THE INVENTION

The present invention provides a meta material having a large area and a method of manufacturing the same.

The present invention also provides a meta material reducing propagation loss of an electromagnetic wave with light and a method of manufacturing the same.

Embodiments of the present invention provide meta materials comprising: a substrate; at least one conductive nano pattern patterned on the substrate and having a size with a negative refractive index in a predetermined electromagnetic wavelength band; and a dielectric layer covering the conductive nano patterns.

In some embodiments, the conductive nano patterns may comprise graphene or a graphene oxide.

In other embodiments, the conductive nano patterns may comprise at least one of silver, gold, aluminum, copper, and nickel.

In still other embodiments, the conductive nano patterns may be formed of at least one concentric ring in a parallel direction to the substrate.

In even other embodiments, the concentric rings may be arranged in a triangular grid or a rectangular grid in the parallel direction to the substrate.

In yet other embodiments, the concentric rings may have the negative refractive index with respect to an electromagnetic wave of at least one single wavelength in a wavelength band of 400 nm to 650 nm, when the concentric rings have a line width of 25 nm.

In further embodiments, the dielectric layer may be provided between the conductive nano patterns; the conductive nano patterns and the dielectric layer may be alternately stacked on the substrate; and at least one hole may penetrate the conductive nano patterns and the dielectric layer.

In still further embodiments, the holes may have at least one of a rectangular shape or a circular shape.

In even further embodiments, the dielectric layer and the conductive nano pattern may have thicknesses of 17 nm and 40 nm, respectively; and the holes of the rectangular shape may have a width and a length of 60 nm and 90 nm, respectively; and when the holes have a period of 300 nm, they may have a negative refractive index with respect to an electromagnetic wave of a 670 nm wavelength band.

In yet further embodiments, the dielectric layer may comprise an aluminum oxide layer, a silicon oxide layer, a titanium oxide layer, or a magnesium fluoride layer.

In yet further embodiments, as a dielectric constant or an original refractive index of the dielectric layer is lower, the dielectric constant or an original refractive index may have a negative refractive index with respect to an electromagnetic wave of a short wavelength band.

In other embodiments of the present invention, methods of manufacturing a meta material may comprise: preparing a substrate; forming at least one conductive nano pattern having a negative refractive index on the substrate; and forming a dielectric layer on the conductive nano patterns having a concentric ring shape.

In some embodiments, the conductive nano patterns may comprise graphene formed using a chemical vapor deposition method or a graphene oxide formed using a graphite oxidation-reduction method.

In other embodiments, the conductive nano patterns may be formed using a copolymerization soft patterning method.

In still other embodiments, the copolymerization soft patterning method may comprise: forming a block copolymer on the substrate; forming a photoresist pattern exposing the block copolymer; selectively exposing the substrate using a self-assembly method of the block copolymer; and forming the concentric ring shape with the graphene or the graphene oxide on the exposed substrate.

In even other embodiments, the block copolymer may be polystyrene(PS)-random-polymethylmethacrylate(PMMA) comprising PS and PMMA.

In yet other embodiments, the self-assembly method of the block copolymer may comprise: arranging the PS and the PMMA of the block copolymer on the substrate, with the concentric ring shape; and exposing the substrate by removing the PMMA of the block copolymer.

In still other embodiments of the present invention, methods of manufacturing a meta material comprise: alternately stacking conductive layers and a dielectric layer on a substrate; and forming at least one hole penetrating the dielectric layer and the conductive layers by patterning the dielectric layer and the conductive layers.

In some embodiments, the conductive layers may comprise graphene formed using a chemical vapor deposition method or a graphene oxide formed using a graphite oxidation-reduction method.

In other embodiments, the holes may be formed using a focused ion beam or a reactive ion etching method.

BRIEF DESCRIPTION OF THE DRAWINGS

The accompanying drawings are comprised to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1A:
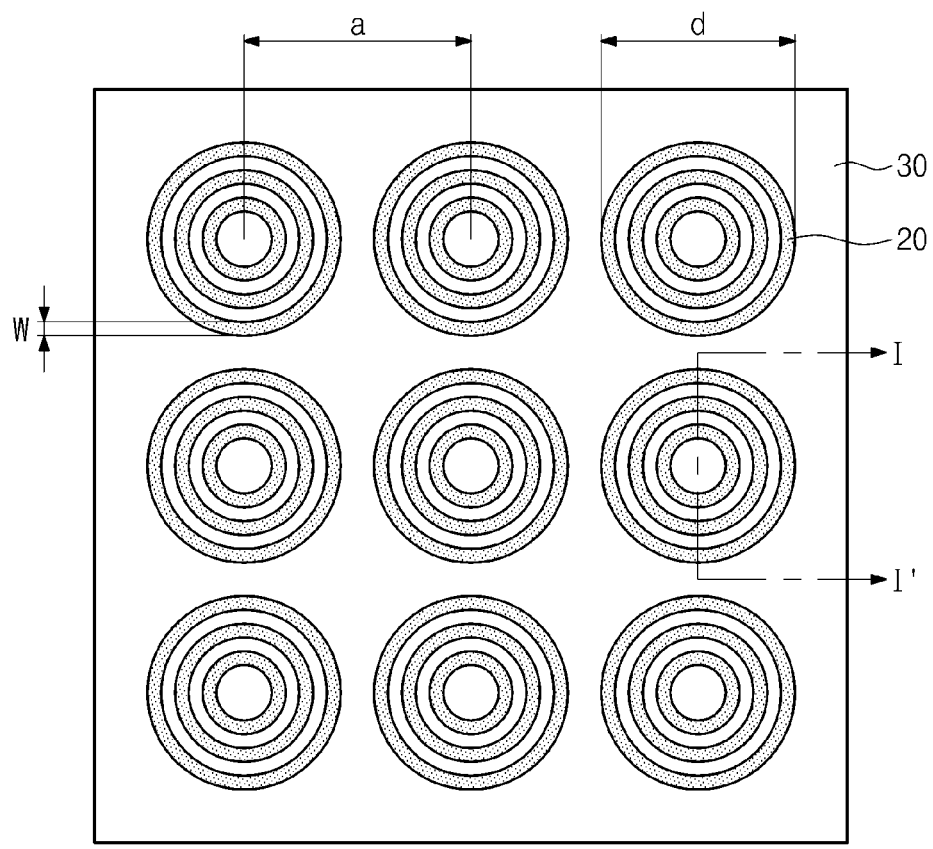
FIGS. 1A and 1B are plan views illustrating a meta material according to a first embodiment of the present invention.

Hereinafter, advantages of the present invention in comparison with the related art will be clarified through the Detailed Description of Preferred Embodiments and the Claims with reference to the accompanying drawings. In particular, the present invention is well pointed out and clearly claimed in the Claims. The present invention, however, may be best appreciated by referring to the following Detailed Description of Preferred Embodiments with reference to the accompanying drawings. In the drawings, like reference numerals refer to like elements throughout.

In the following description, the technical terms are used only for explaining specific embodiments while not limiting the present invention. The meaning of "include," "comprise," "including," or "comprising," specifies a property, a region, a fixed number, a step, a process, an element and/or a component but does not exclude other properties, regions, fixed numbers, steps, processes, elements and/or components. Since preferred embodiments are provided below, the order of the reference numerals given in the description is not limited thereto.

Figure 1B:
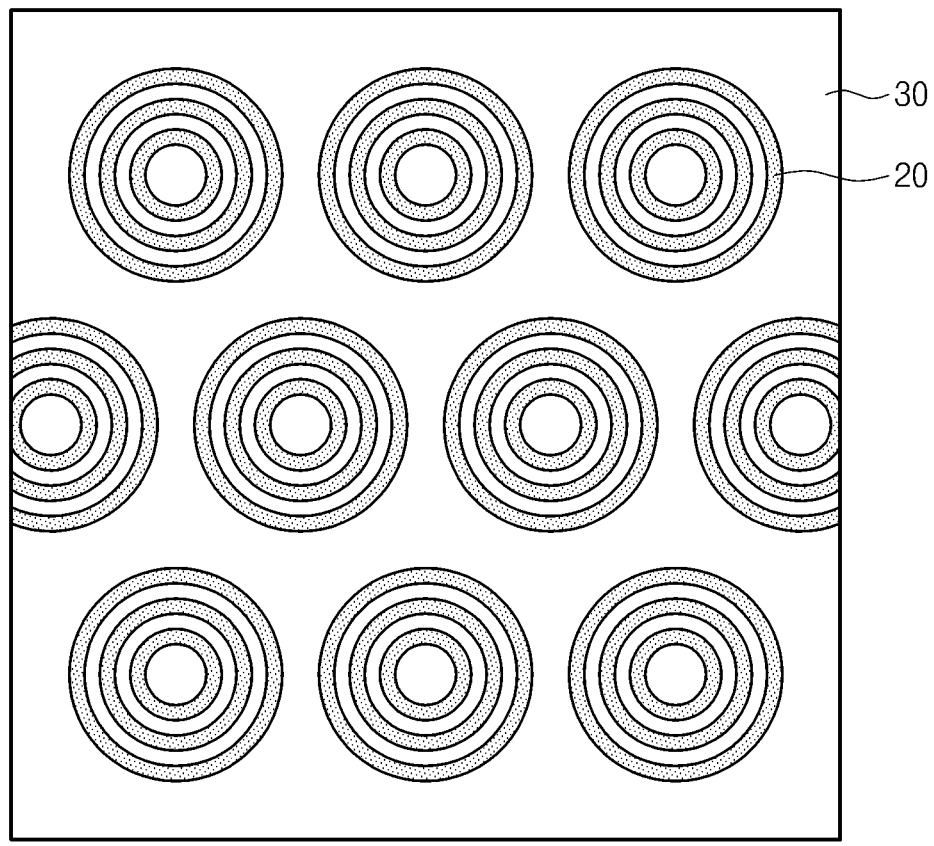
Figure 2:
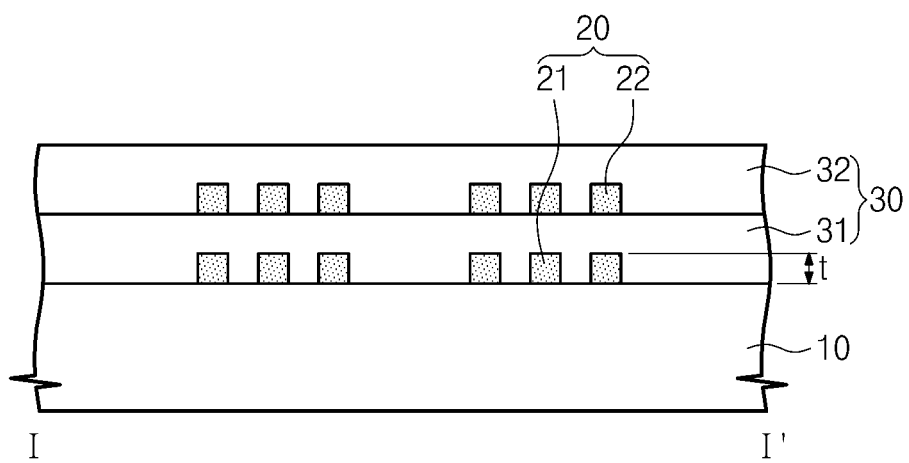
FIG. 2 is a sectional view taken along the line I-I' of FIG. 1A.

FIGS. 1A and 1B are plan views illustrating a meta material according to a first embodiment of the present invention. FIG. 2 is a sectional view taken along the line I-I' of FIG. 1A.

Referring to FIGS. 1A through 2, a meta material according to the first embodiment of the present invention may comprise at least one concentric ring 20 disposed between a plurality of dielectric layers 30 stacked on a substrate 10. The concentric ring 20 may comprise conductive layers formed of a semi-metal element such as graphene and a metal element such as silver, gold, aluminum, copper, and nickel. The concentric rings 20 may only consist of a semi-metal element, or may consist of a semi-metal element and a metal element separately, or may consist of a mixture thereof. The graphene may have conductivity that is more than about 10 times of that of a metal element.

Accordingly, since the meta material according to the first embodiment of the present invention comprises the concentric rings 20 (formed of graphene having a higher conductivity than a metal element), propagation loss of electromagnetic waves may be reduced.

The sizes, thicknesses, and number of the concentric rings 20 may be adjusted as a nano pattern having a negative refractive index with respect to a predetermined electromagnetic wavelength band. For example, when the concentric rings 20 has a significantly smaller size than a electromagnetic wavelength of a visible light, a uniform refractive index may be obtained by suppressing diffraction and diffusion caused by them, and a negative refractive index with respect to a specific size, thickness, and number may be obtained in a wavelength of visible light. The specific size, thickness, and number of a negative refractive index may not be easily obtained through analytical methods but they may be obtained relatively easily through numerical analysis methods. Here, a meta material structure consisting of the concentric rings 20 has a negative refractive index (i.e., a direction of a phase velocity of an electromagnetic wave propagating therein is opposite to a propagation direction of light energy) and shows a negative refractive phenomenon (by refracting an electromagnetic wave toward the opposite direction, which is incident from air or a dielectric into the concentric rings 20).

The concentric rings 20 may have an interval adjustable in a parallel direction to the substrate 10. The concentric rings 20 may be arranged with a rectangular grid shown in FIG. 1A or a triangular grid shown in FIG. 1B in a parallel direction to the substrate 10. The concentric rings 20 may comprise at least two rings with a diameter d of about 200 nm to about 600 nm. The concentric rings 20 may be arranged with an interval a of about 500 nm to about 800 nm. Each of the concentric rings 20 may have a line width w of about 10 nm to about 40 nm and a thickness t of about 4 nm to about 50 nm. For example, when the concentric rings 20 have the line width of about 25 nm, they may have a negative refractive index with respect to an electromagnetic wave of at least one single wavelength band in a wavelength region of about 400 nm to about 650 nm.

The dielectric layers 30 may transmit an electromagnetic wave. The dielectric layers 30 may comprise at least one dielectric such as an aluminum oxide layer, a silicon oxide layer, a titanium oxide layer, and a magnesium fluoride layer.

The dielectric layers 30 may divide the concentric rings 20 separately, which are stacked in a vertical direction to the substrate 10. In relation to the dielectric layers 30, the same kind of dielectrics or respectively different kinds of dielectrics may be disposed in a vertical direction to the substrate 10. The concentric rings 20 in the dielectric layers 30 may overlap in a vertical direction to the substrate 10. Accordingly, the dielectric layers 30 may become spacers that separate the concentric rings 29 in a vertical direction. The dielectric layers 30 and the concentric rings 20 may have a height from the substrate 10 of about 400 nm to about 650 nm, which are identical to a wavelength band of a visible light.

The substrate 10 may consist of a flat substrate comprising at least one of quartz and glass or a flexible substrate comprising at least one of polymethylmethacrylate (PMMA), polycarbonate (PC), cycloolefincopolymer (COC), and polyethylene terephthalate. Moreover, the flat substrate and the flexible substrate may be formed of other materials and the present invention is not limited thereto.

A method of manufacturing the meta material according to the first embodiment of the present invention is described as follows.

Figure 3A:
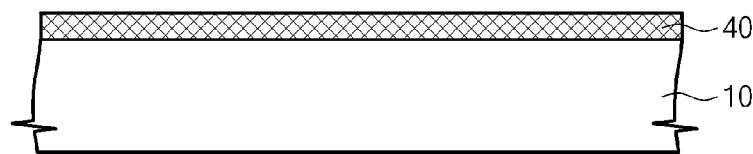
FIGS. 3A through 3P are manufacturing sectional views illustrating sequentially a method of manufacturing the meta material according to the first embodiment of the present invention.
Figure 3B:
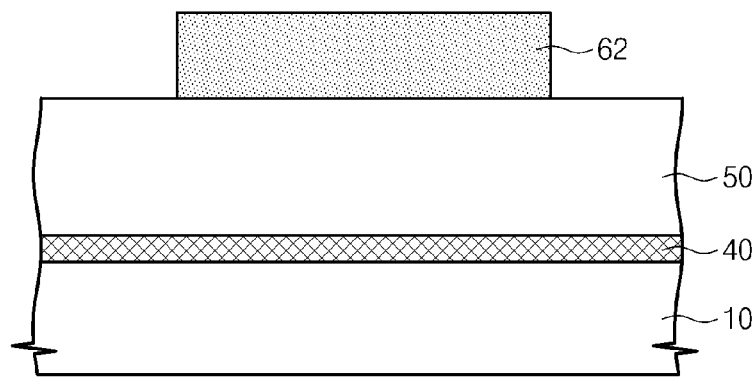
Figure 3C:
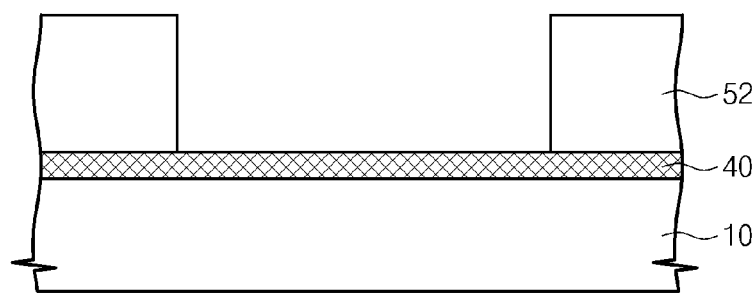
Figure 3D:
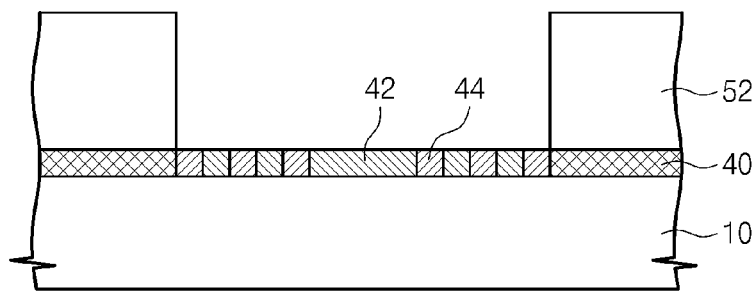
Figure 3E:
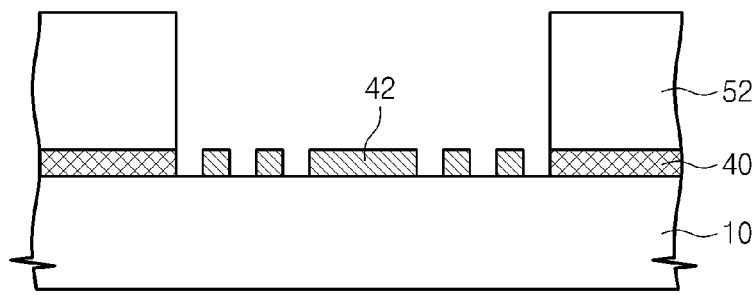
Figure 3F:
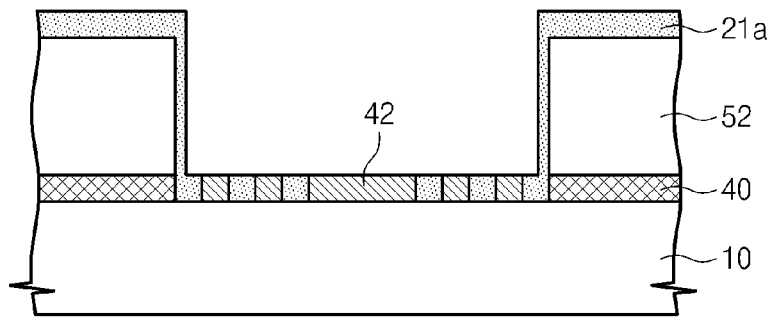
Figure 3G:
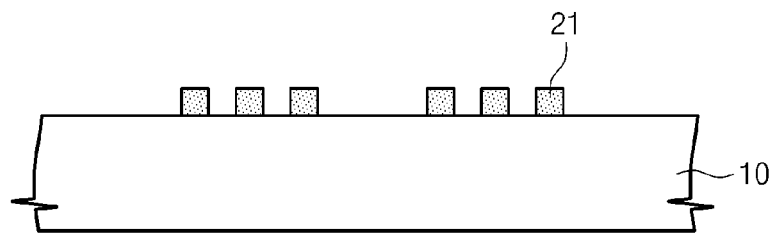
Figure 3H:
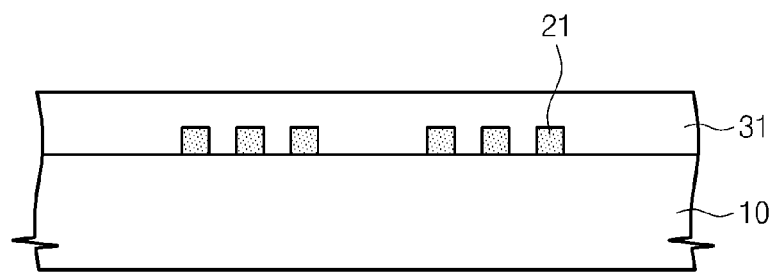
Figure 3I:
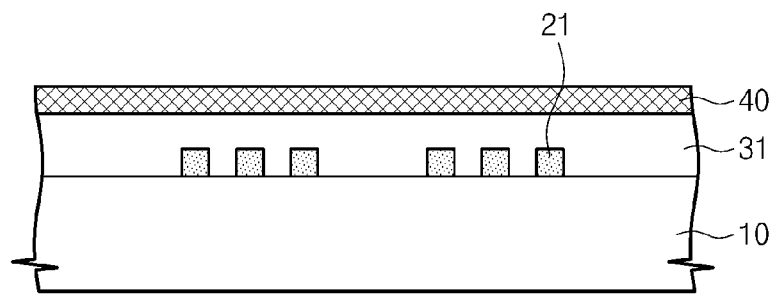
Figure 3J:
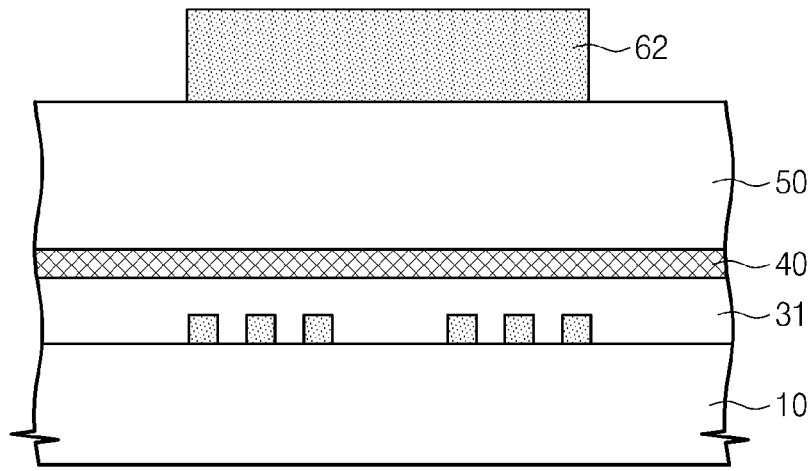
Figure 3K:
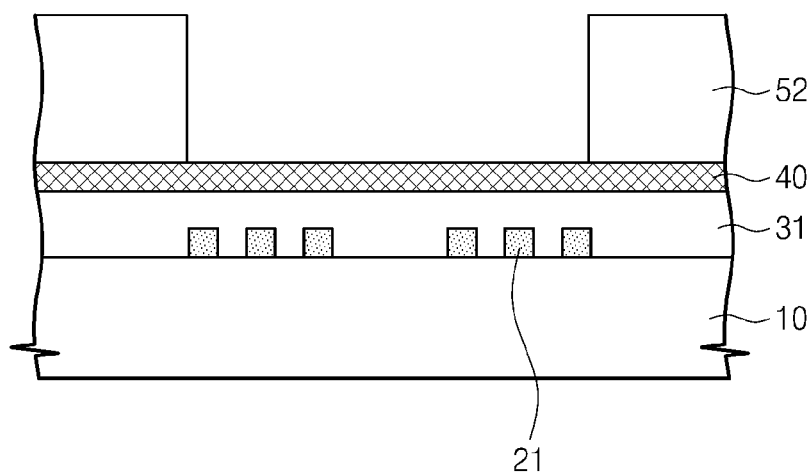
Figure 3L:
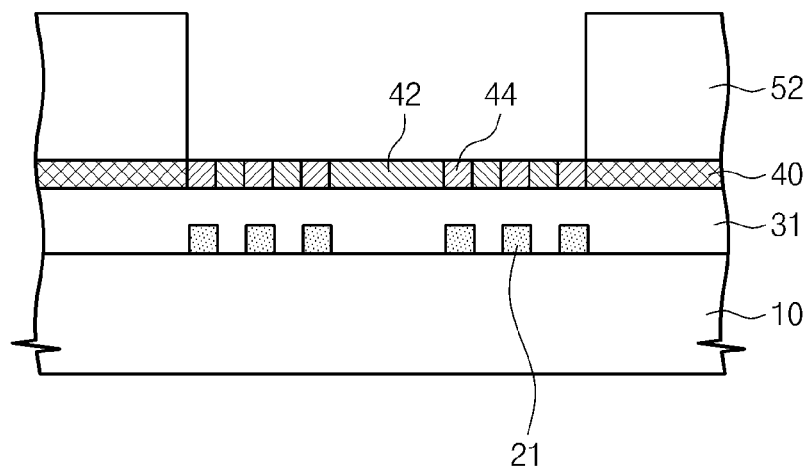
Figure 3M:
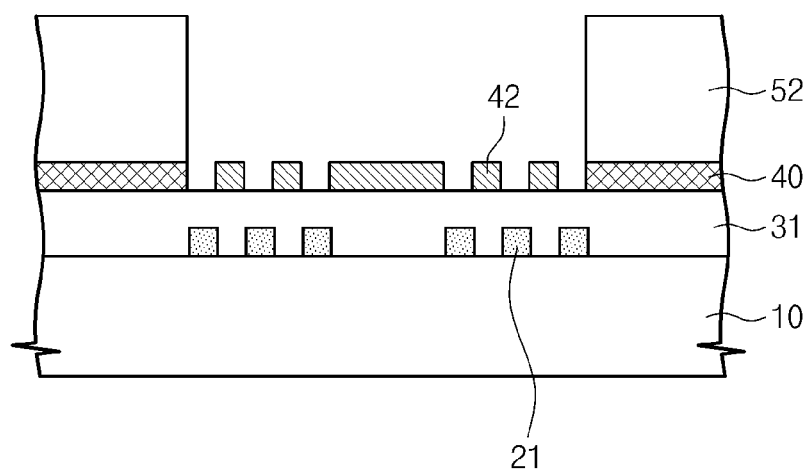
Figure 3N:
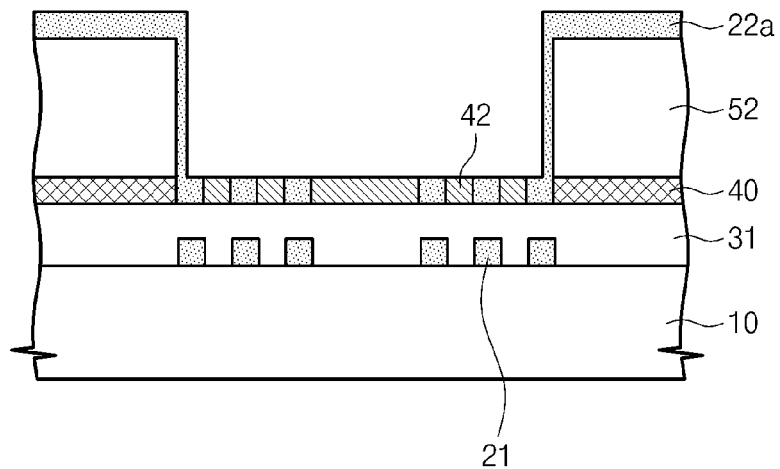
Figure 3O:
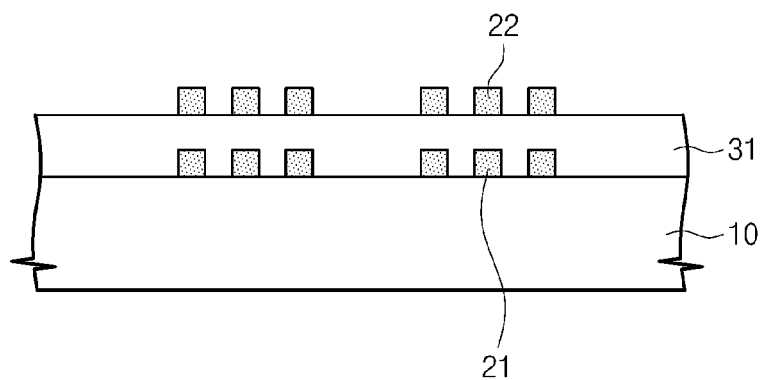
Figure 3P:
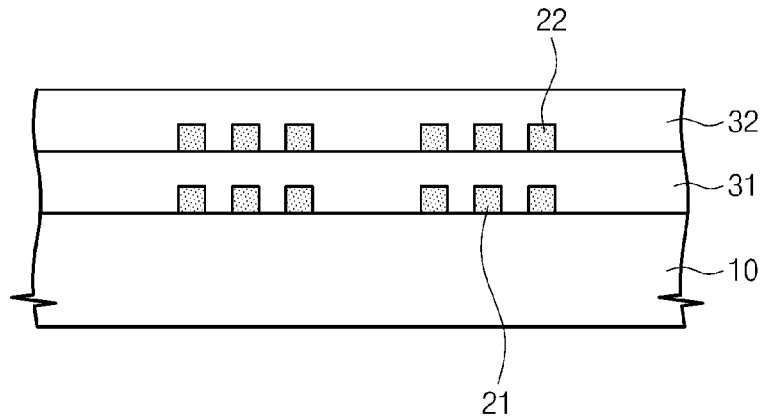
Figure 4A:
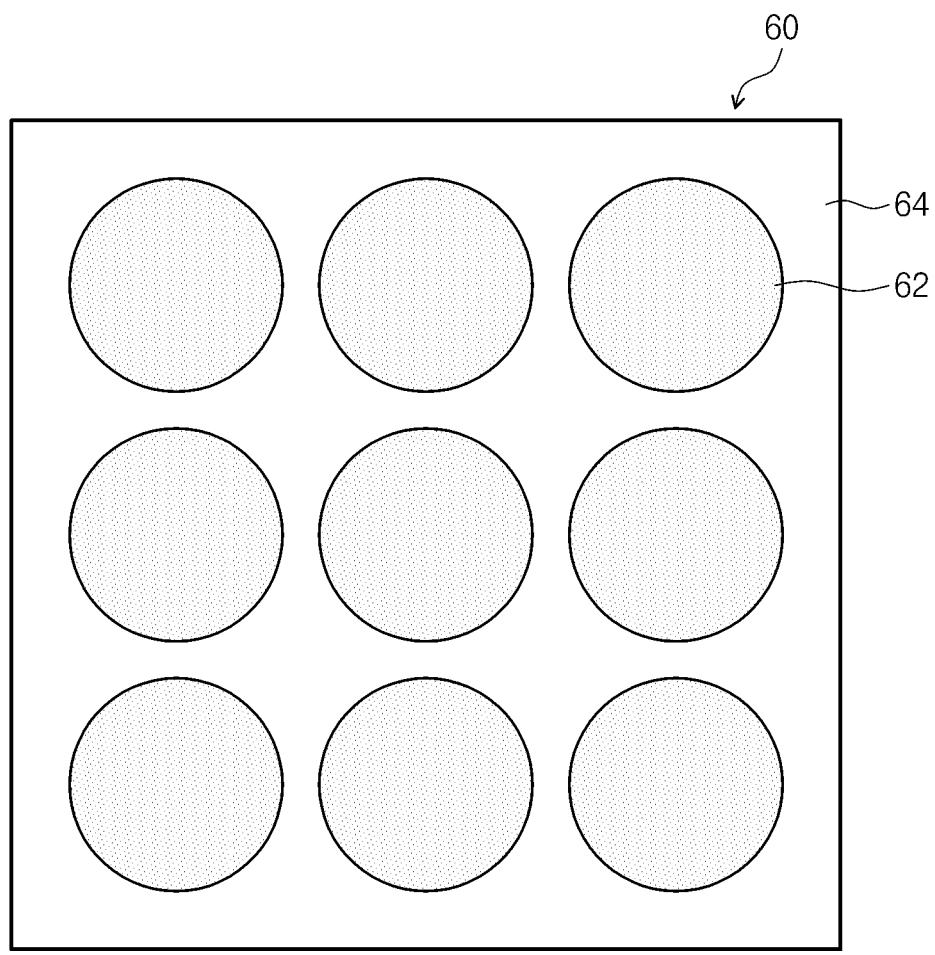
FIGS. 4A and 4B are plan views illustrating a photo mask with shielding layers arranged in a rectangular grid and a triangular grid.
Figure 4B:
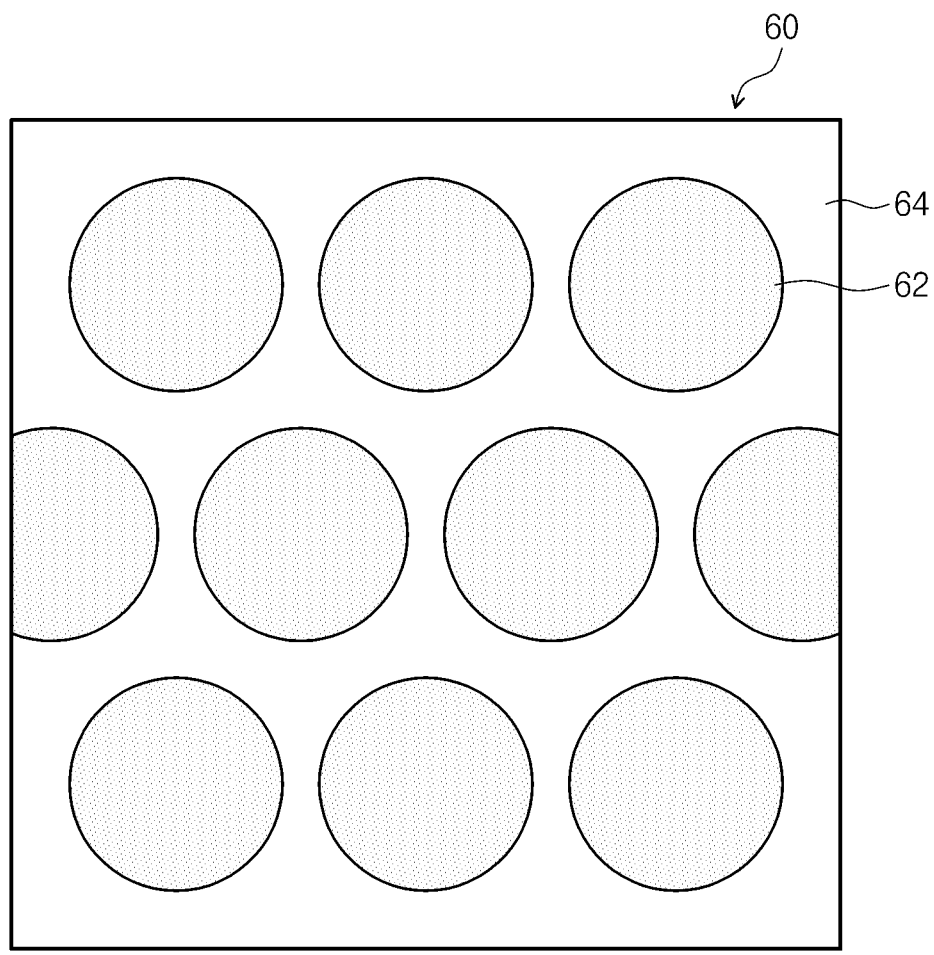

FIGS. 3A through 3P are manufacturing sectional views illustrating sequentially a method of manufacturing the meta material according to the first embodiment of the present invention. FIGS. 4A and 4B are plan views illustrating a photo mask with shielding layers arranged in a rectangular grid and a triangular grid.

Referring to FIG. 3A, a block copolymer 40 is first formed on a substrate 10. The block copolymer 40 may be spin-coated on the substrate 10. For example, the block copolymer 40 may comprise polystyrene-random-poly(methyl methacrylate).

Referring to FIGS. 3B, 4A, and 4B, a photoresist 50 is applied on the block copolymer 40. The photoresist 50 may be spin-coated on the block copolymer 40. The photoresist 50 may be exposed to ultraviolet ray. The photoresist 50 may be selectively exposed to ultraviolet ray by a photo mask 60 where a shielding layer 62 is arranged in a rectangular grid or a triangular grid in a glass 64.

Referring to FIG. 3C, a photoresist pattern 52 is formed. The photoresist 50 may comprise a positive photoresist 50 where a portion exposed to ultraviolet ray is developed by a developer and a negative photoresist 50 where a portion not exposed to ultraviolet ray is developed. For example, the negative photoresist 50 is shown in FIGS. 3B and 3C. The photoresist pattern 52 may define a plane size of the concentric rings 20.

Referring to FIG. 3D, the block copolymer 40 exposed in the photoresist pattern 52 is self-assembled. The block copolymer 40 may comprise a plurality of respectively different materials that are self-assembled by a high temperature, an electric field, or a magnetic field. For example, the block copolymer 40 of PS-r-PMMA may be melted at a temperature of about 150° C. to about 250° C. Additionally, once an electric field is applied, PS 42 and PMMA 44 may be voluntarily separated. Accordingly, the PS-r-PMMA may be separated into the PS 42 and the PMMA 44 in the photoresist pattern 42 by a high temperature and an electric field, and then they may be self-assembled separately with a concentric circular shape.

Referring to FIG. 3E, the PMMA 44 of the block copolymer 40 is removed. The PMMA 44 may be removed by an organic selective etch solvent.

Referring to FIG. 3F, a first conductive layer 21a is formed on the substrate 10. The first conductive layer 21a may comprise graphene formed through a chemical vapor deposition method or a graphene oxide formed through a graphite oxidation-reduction method. The chemical vapor deposition method may generate graphene from a graphite of about 500° C. to about 1000° C., a reaction gas of methane and hydrogen gases, a catalyst of a metal (such as nickel, copper, iron, platinum, palladium, and ruthenium). The graphite oxidation-reduction method smashes the graphite in water using ultrasonic waves to undergo an oxidation and reduction process, thereby generating a graphene oxide. Moreover, the first conductive layer 21a may comprise a metal such as silver, gold, aluminum, copper, or nickel, which is formed using a physical vapor deposition method such as sputtering or electron beam deposition.

Referring to FIG. 3G, first concentric rings 21 are formed. The photoresist pattern 52 and the PS 42 are lifted off so that the first concentric rings 21 consisting of a first conductive layer 21a may be formed on the substrate 10. The photoresist pattern 52 and the PS 42 may be removed using a highly volatile solution such as methanol. The first conductive layer 21a on the photoresist pattern 52 and the PS 42 is lifted off and the first conductive layer 21a contacting the substrate 10 may remain as the first concentric rings 21.

Accordingly, in relation to the method of manufacturing the meta material according to the first embodiment of the present invention, the first concentric rings 21 may be formed through a copolymerization soft patterning method comprising a self-assembling method of the block copolymer exposed from the photoresist pattern 52.

Referring to FIG. 3H, a first dielectric layer 31 is formed on the substrate 10 and the first concentric rings 21. The first dielectric layer 31 may comprise a silicon oxide layer spin-coated on the first concentric rings 21 and the substrate 10. Additionally, the first dielectric layer 31 may comprise an aluminum oxide layer, a silicon oxide layer, a titanium oxide layer, and a magnesium fluoride layer formed through a sputtering and electron beam deposition method or an atomic layer deposition method.

Accordingly, the method of manufacturing the meta material according to the first embodiment of the present invention may form the first concentric rings 21 on the substrate 10 using a self-assembly of the block copolymer 40. Additionally, after the first dielectric layer 31 is formed on the first concentric rings 21, second concentric rings may be formed through self-assembly of the bock copolymer 40. The second concentric rings may be formed through a similar method to the first concentric rings 21. This will be described in more detail.

Referring to FIG. 3I, a block copolymer 40 is formed on the first dielectric layer 31. The block copolymer 40 may be spin-coated on the first dielectric layer 31. As mentioned above, the block copolymer 40 may comprise PS-r-PMMA.

Referring to FIGS. 3J, 4A, and 4B, a photoresist 50 is applied on the block copolymer 40. The photoresist 50 may be spin-coated on the block copolymer 40. The photoresist 50 may be exposed to ultraviolet ray. The photoresist 50 may be selectively exposed to ultraviolet ray by a photo mask 60 where a shielding layer 62 is arranged in a rectangular grid or a triangular grid in a glass 64.

Referring to FIG. 3K, a photoresist pattern 52 is formed. The photoresist 50 may be formed from a negative photoresist 50 where a portion not exposed to ultraviolet ray is developed. The photoresist pattern 52 may expose the block copolymer 40 by the same size as the first concentric rings 21.

Referring to FIG. 3l, the block copolymer 40 exposed in the photoresist pattern 52 is self-assembled. For example, the block copolymer 40 may comprise PS-r-PMMA where the PS 42 and the PMMA 44 are self-aligned by an electric field with a concentric shape in the photoresist pattern 52.

Referring to FIG. 3M, the PMMA 44 of the block copolymer 40 is removed. The PMMA 44 may be removed by an organic selective etch solvent.

Referring to FIG. 3N, a second conductive layer 22a is formed on the substrate 10. Like the first conductive layer 21a, the second conductive layer 21a may comprise graphene formed through a chemical vapor deposition method or a graphene oxide formed through a graphite oxidation-reduction method. The chemical vapor deposition method may generate graphene from a graphite of about 500° C. to about 1000° C., a reaction gas of methane and hydrogen gases, a catalyst of a metal (such as nickel, copper, iron, platinum, palladium, and ruthenium). The graphite oxidation-reduction method smashes the graphite in water using ultrasonic waves to undergo an oxidation and reduction process, thereby generating a graphene oxide. Moreover, the second conductive layer 22a may comprise a metal such as silver, gold, aluminum, copper, or nickel, which is formed using a physical vapor deposition method such as sputtering or electron beam deposition.

Referring to FIG. 3O, second concentric rings 22 consisting of the second conductive layer 22a are formed by lifting off the photoresist pattern 52 and the PS 42. The photoresist pattern 52 and the PS 42 may be removed using a highly volatile solution such as methanol. The second conductive layer 22a on the photoresist pattern 52 and the PS 42 is lifted off and the second conductive layer 22a contacting the substrate 10 may remain as the second concentric rings 22. The second concentric rings 22 may overlap the first concentric rings 21.

Referring to FIG. 3P, a second dielectric layer 32 is formed on the first dielectric layer 31 and the second concentric rings 22. The second dielectric layer 32 may be spin-coated on the second concentric rings 22 and the first dielectric layer 31. The second dielectric layer 32 may comprise an aluminum oxide layer, a silicon oxide layer, a titanium oxide layer, and a magnesium fluoride layer formed through a sputtering and electron beam deposition method or an atomic layer deposition method.

Although not shown in the drawings, other concentric rings 20 and the dielectric layers 30 are alternately formed on the second dielectric 32. For example, the concentric rings 20 and the dielectric layer 30 are alternately and repeatedly formed until their height is about 400 nm to about 650 nm.

Accordingly, in relation to the method of manufacturing the meta material according to the first embodiment of the present invention, at least one concentric ring 20 may be repeatedly formed between the substrate 10 and the dielectric layer 30 through self-assembly of the block copolymer 40.

Figure 5A:
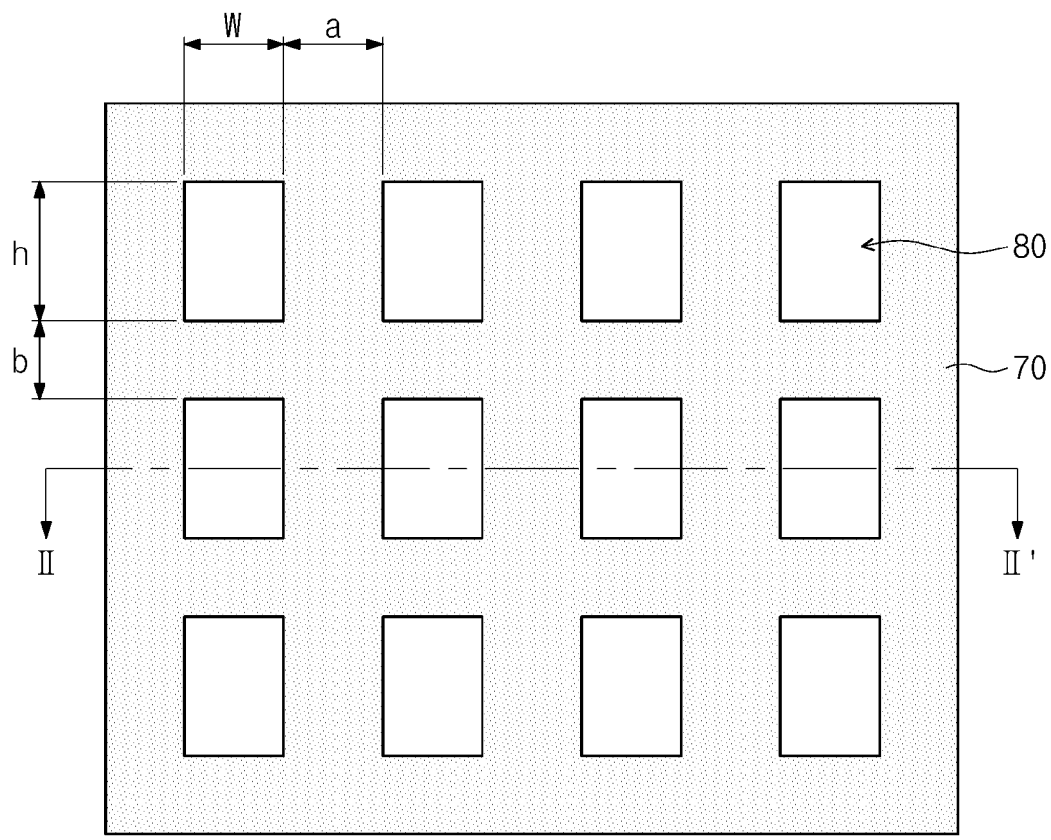
FIGS. 5A and 5B are plan views illustrating a meta material according to a second embodiment of the present invention.
Figure 5B:
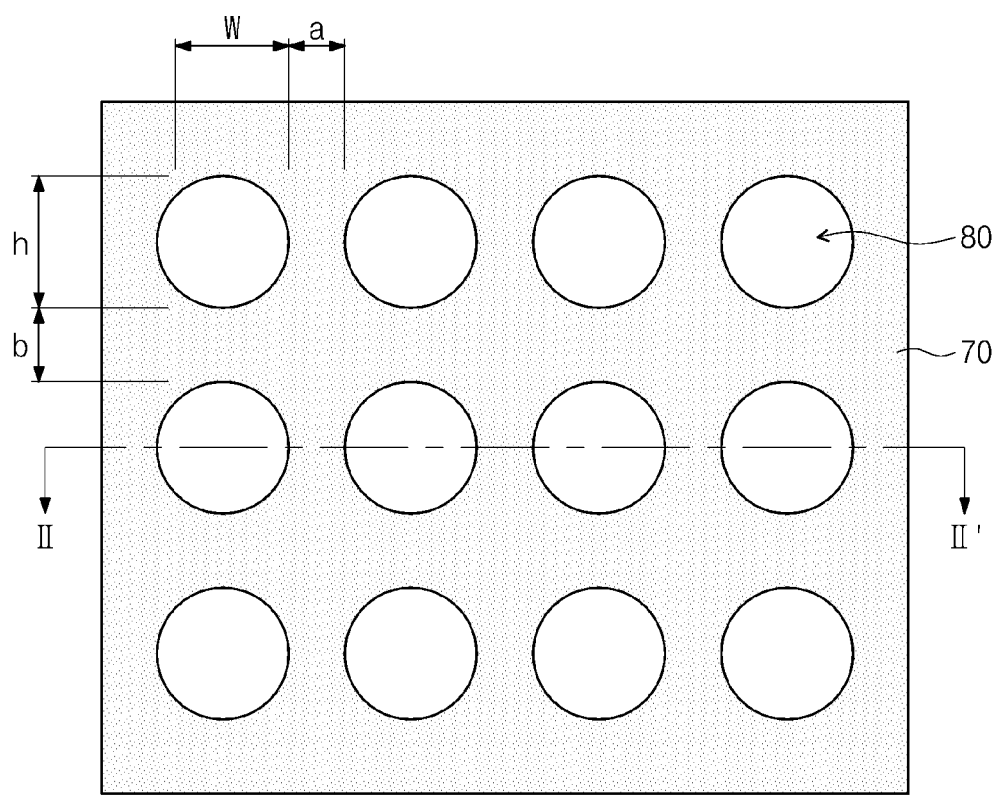
Figure 6:
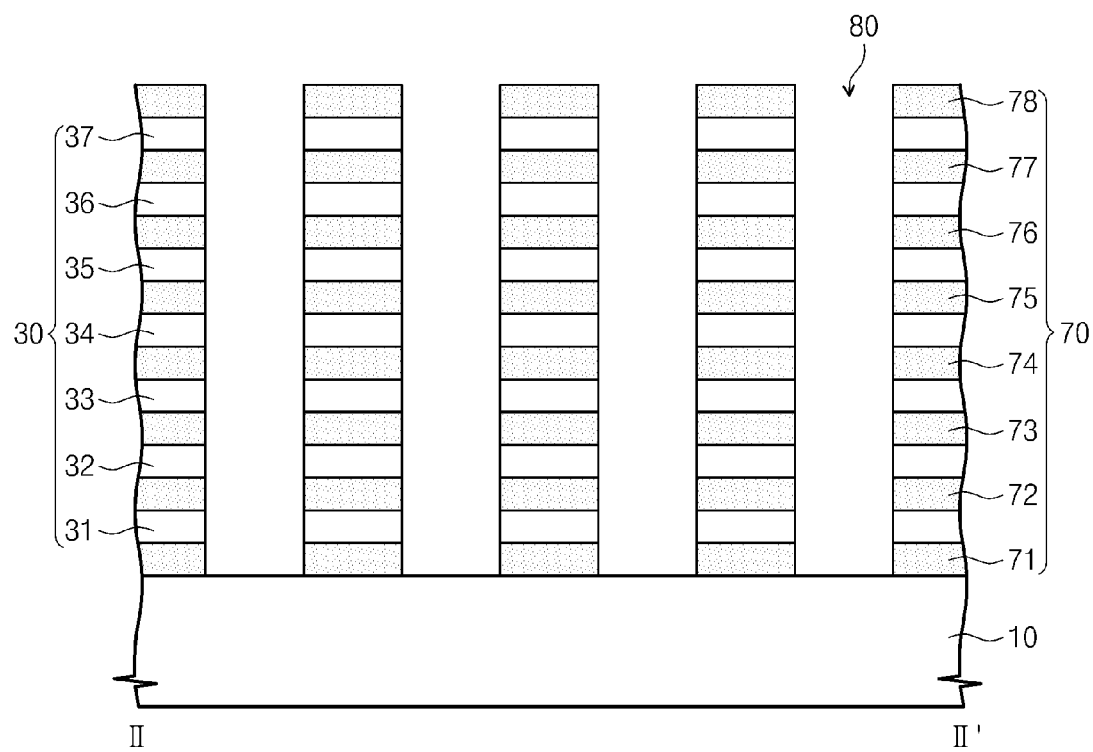
FIG. 6 is a sectional view taken along the line II-II' of FIG. 5A.

FIGS. 5A and 5B are plan views illustrating a meta material according to a second embodiment of the present invention. FIG. 6 is a sectional view taken along the line II-II' of FIG. 5A. Here, the meta material according to the second embodiment of the present invention may be described with the same reference numerals as the first embodiment. However, reference numerals of conductive layers may be different from those of the first embodiment.

Referring to FIGS. 5A through 6, the meta material according to the second embodiment of the present invention may comprise holes 80 after the conductive layers 70 and the dielectric layers 30 stacked alternately on the substrate 10 are removed. The conductive layers 70 may comprise graphene or a semi-metal element such as a graphene oxide of less than about 10 stories. The graphene may have a conductivity that is about ten times of metal elements.

Accordingly, since the meta material according to the second embodiment of the present invention comprises a graphene having a higher conductivity than a metal element, propagation loss of electromagnetic waves may be reduced.

The conductive layers 70 may comprise metal elements such as silver, gold, aluminum, cooper, and nickel. The dielectric layers 30 may comprise a dielectric such as an aluminum oxide layer, a silicon oxide layer, a titanium oxide layer, and a magnesium fluoride layer. The conductive layers 70 and the dielectric layers 30 may be alternately and repeatedly disposed. At this point, the dielectric layers 30 may comprise a dielectric such as optical polymer. The conductive layers 70 and the dielectric layers 30 may be disposed from the first story to the ninety-ninth story. Among them, the conductive layers 70 may be disposed from the first story to the forty-ninth story and the dielectric layers 30 may be disposed from the first story to the forty-eighth story.

When the holes 80 have a significantly smaller size than a wavelength of an electromagnetic wave in a visible light, they may have a negative refractive index with respect to a specific size and number. The specific size, thickness, and number of a negative refractive index may not be easily obtained through analytical methods but they may be obtained relatively easily through numerical analysis methods. Here, there is a negative refractive index (i.e., a direction of a phase velocity of an electromagnetic wave propagating in a hole structure is opposite to a propagation direction of light energy) and a negative refractive phenomenon (by refracting an electromagnetic wave toward the opposite direction, which is incident from actual air or a dielectric into the concentric rings 20).

The holes 80 of the rectangular shape shown in FIG. 5A may have a width w and a length h of about 150 nm to about 950 nm. Likewise, the holes 80 of the circular shape shown in FIG. 5B may have a diameter w or h of about 150 nm to about 950 nm. The holes 80 may be arranged with a width interval a and a length interval b of about 200 nm to about 1000 nm in a parallel direction to the substrate 10.

The substrate 10 may consist of a flat substrate comprising at least one of quartz and glass or a flexible substrate comprising at least one of polymethylmethacrylate (PMMA), polycarbonate (PC), cycloolefincopolymer (COC), and polyethylene terephthalate. Moreover, the flat substrate and the flexible substrate may be formed of other materials and the present invention is not limited thereto.

Figure 7A:
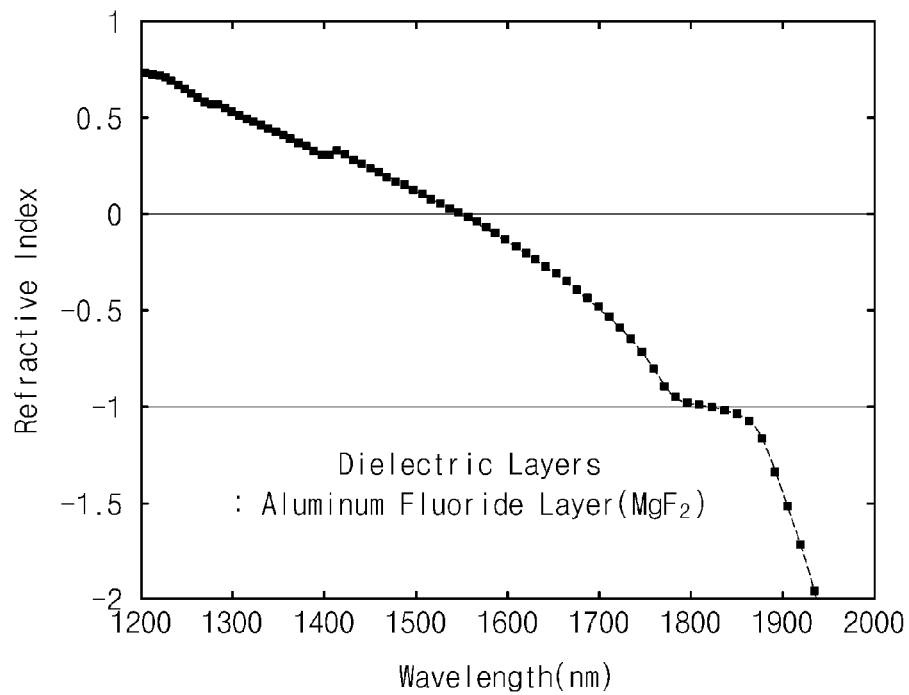
FIGS. 7A through 7C are graphs illustrating a refractive index change according to kinds of a dielectric layer in the meta material according to the second embodiment of the present invention.
Figure 7B:
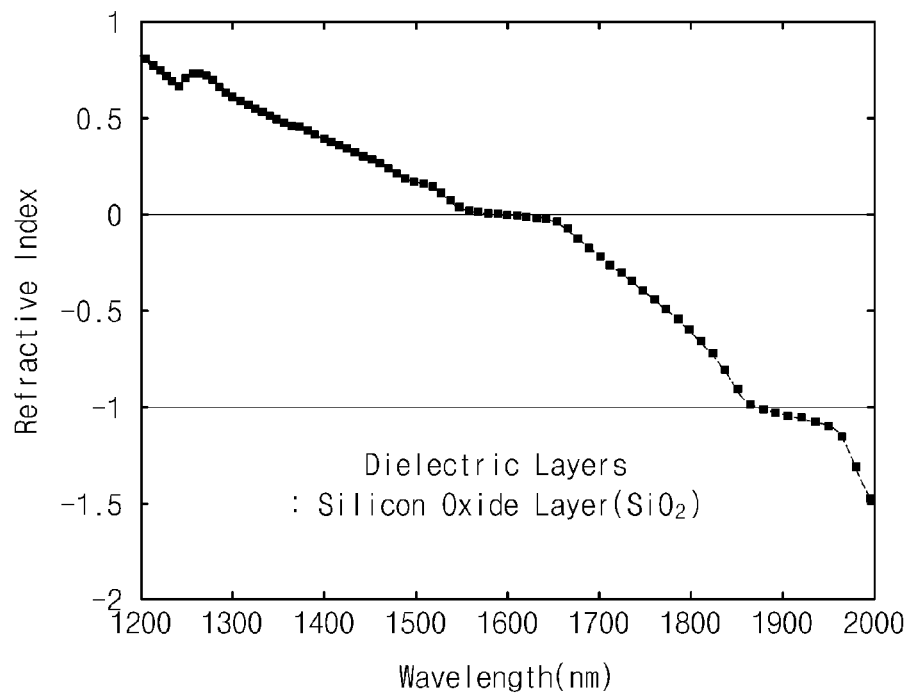
Figure 7C:
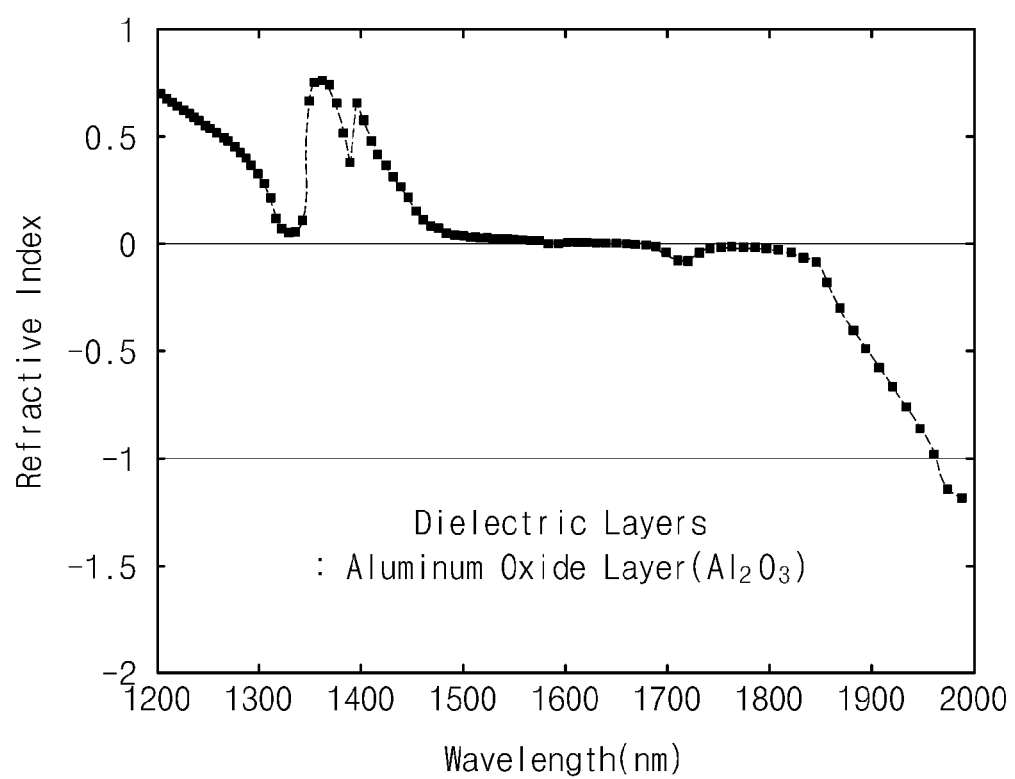

FIGS. 7A through 7C are graphs illustrating a refractive index change according to kinds of a dielectric layer in the meta material according to the second embodiment of the present invention.

Referring to FIGS. 5A, 6, and 7A through 7C, the meta material according to the second embodiment of the preset invention may have a negative refractive index with respect to an electromagnetic wave of a short wavelength band as a dielectric constant of the dielectric layers 30 is lowered. Here, the horizontal axis represents an electromagnetic wavelength band and the horizontal axis represents a refractive index in a meta material. The conductive layers 70 and the dielectric layers 30 may be alternately disposed with twenty one stories. The conductive layers 30 may be eleven stories and the dielectric layer 30 may be ten stories. The conductive layers 70 may comprise silver and the dielectric layers 30 may comprise a magnesium fluoride layer, a silicon oxide layer, or an aluminum oxide layer. Each of the conductive layers 70 and the dielectric layers 30 may have a thickness of about 50 nm. A width and a length of the holes 80 in the meta material are about 195 nm and about 595 nm, respectively and their period is about 860 nm.

A dielectric constant of the magnesium fluoride layer is 1.17 and a dielectric constant of the silicon oxide layer is 1.20 and a dielectric constant of the aluminum oxide layer is 1.32. An original refractive index of the dielectric layers 30 may correspond to a square root of a dielectric constant. An original refractive index of the magnesium fluoride layer is 1.37 and an original refractive index of the aluminum oxide layer is 1.75. When a magnesium fluoride layer, a silicon oxide layer, or an aluminum oxide layer consist of dielectric layers, a meta material has a negative refractive index at about 1450 nm, about 1550 nm, and about 1800 nm of the respective layers.

Accordingly, the meta material according to the second embodiment of the present invention may have a negative refractive index with respect to an electromagnetic wave of a short wavelength band as the dielectric constant and original refractive index of the dielectric layer 30 are lowered. Additionally, as the period, width, and height of the holes 80 and the thicknesses of the conductive layers 70 and the dielectric layers 30 are reduced, a negative refractive index may be provided in a shorter wavelength band.

For example, the dielectric layers 30 and the conductive layers 70 have respective thicknesses of about 17 nm and about 400 nm, and the width and length of the holes 80 having a rectangular shape are about 60 nm and 90 nm, respectively. When a period of the holes 80 is about 300 nm, the meta material according to the second embodiment of the present invention may have a negative refractive index with respect to an electromagnetic wave of an about 670 nm wavelength band.

A method of manufacturing the meta material according to the second embodiment of the present invention is described as follows.

FIGS. 8A through 8E are manufacturing sectional views illustrating a method of manufacturing the meta material according to the second embodiment of the present invention.

Figure 8A:
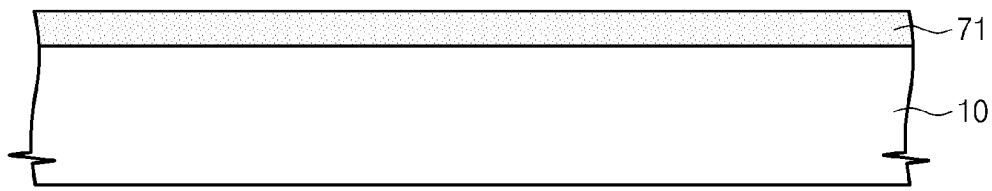
FIGS. 8A through 8E are manufacturing sectional views illustrating a method of manufacturing the meta material according to the second embodiment of the present invention.

Referring to FIG. 8A, a first conductive layer 21 is formed on a substrate 10. The first conductive layer 21 may comprise graphene formed through a chemical vapor deposition method and a graphene oxide formed through a graphite oxidation-reduction method. The first conductive layer 71 may comprise graphene or graphene oxide layers of less than about 10 stories. Furthermore, the first conductive layer 71 may be formed using a physical vapor deposition method such as a sputtering or electron beam deposition method.

Figure 8B:
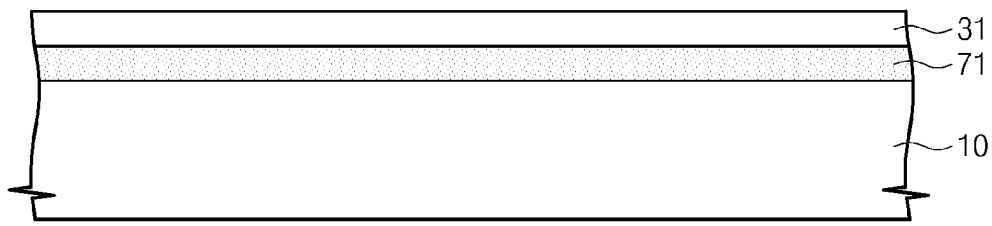

Referring to FIG. 8B, a first dielectric layer 31 is formed on the first conductive layer 71. The first dielectric layer 31 may comprise optical polymer formed through a spin coating method. Moreover, the first dielectric layer 31 may comprise an aluminum oxide layer, a silicon oxide layer, a titanium oxide layer, and a magnesium fluoride layer formed through a sputtering and electron beam deposition method or an atomic layer deposition method.

Figure 8C:
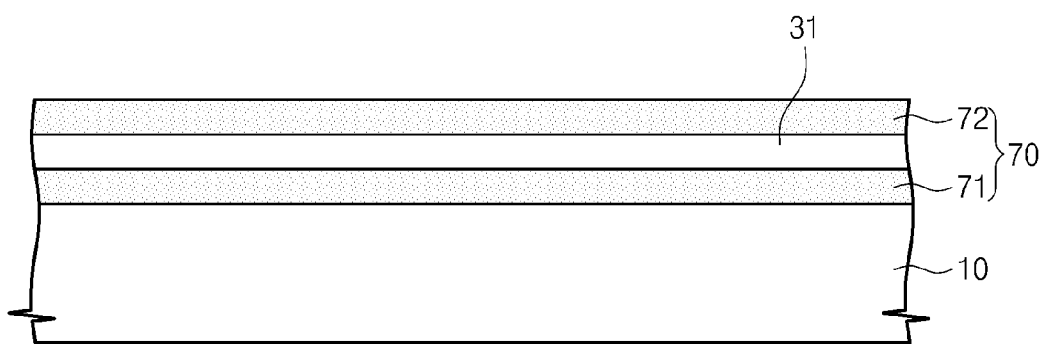

Referring to FIG. 8C, a second conductive layer 72 is formed on the first dielectric layer 31. Like the first conductive layer 71, the second conductive layer 72 may comprise graphene formed through a chemical vapor deposition method and a graphene oxide formed through a graphite oxidation-reduction method.

Figure 8D:
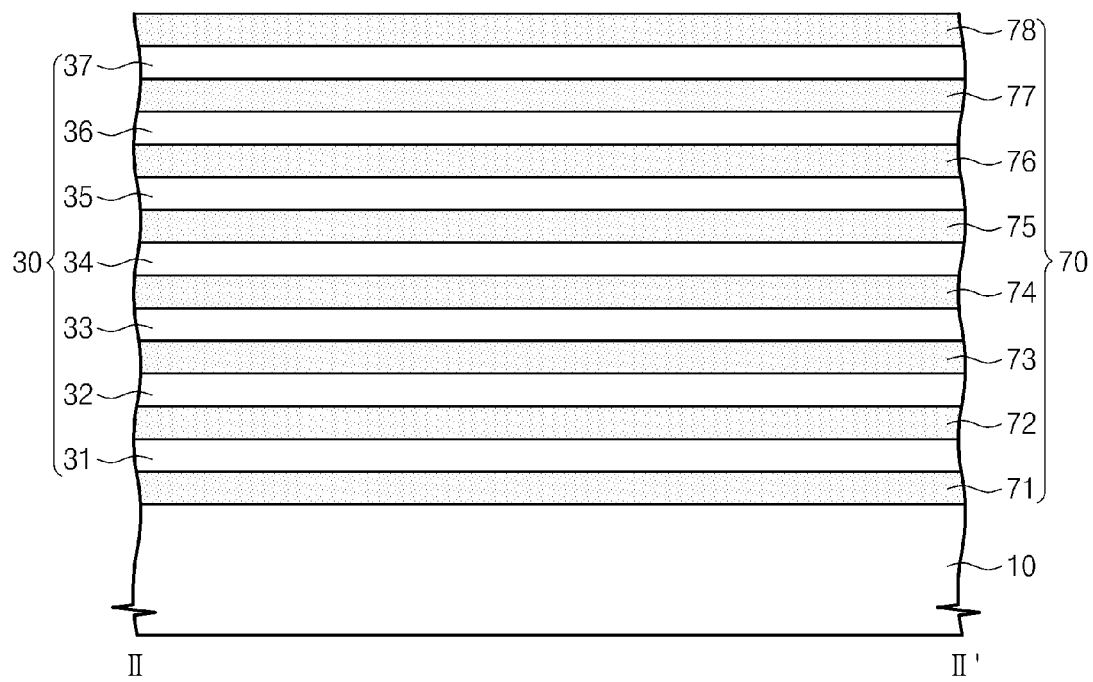

Referring to FIG. 8D, the dielectric layers 30 (comprising the second dielectric layer 32 to the seventh dielectric layer 37) and the conductive layers 70 (comprising the third conductive layer 73 to the eighth conductive layer 78) are alternately formed on the second conductive layer 72. The dielectric layers 30 may comprise an optical polymer formed through spin coating or an aluminum oxide layer, a silicon oxide layer, a titanium oxide layer, and a magnesium fluoride layer formed through a chemical vapor deposition method. The conductive layers 70 may comprise graphene formed through a chemical vapor deposition method and a graphene oxide formed through a graphite oxidation-reduction method.

Figure 8E:
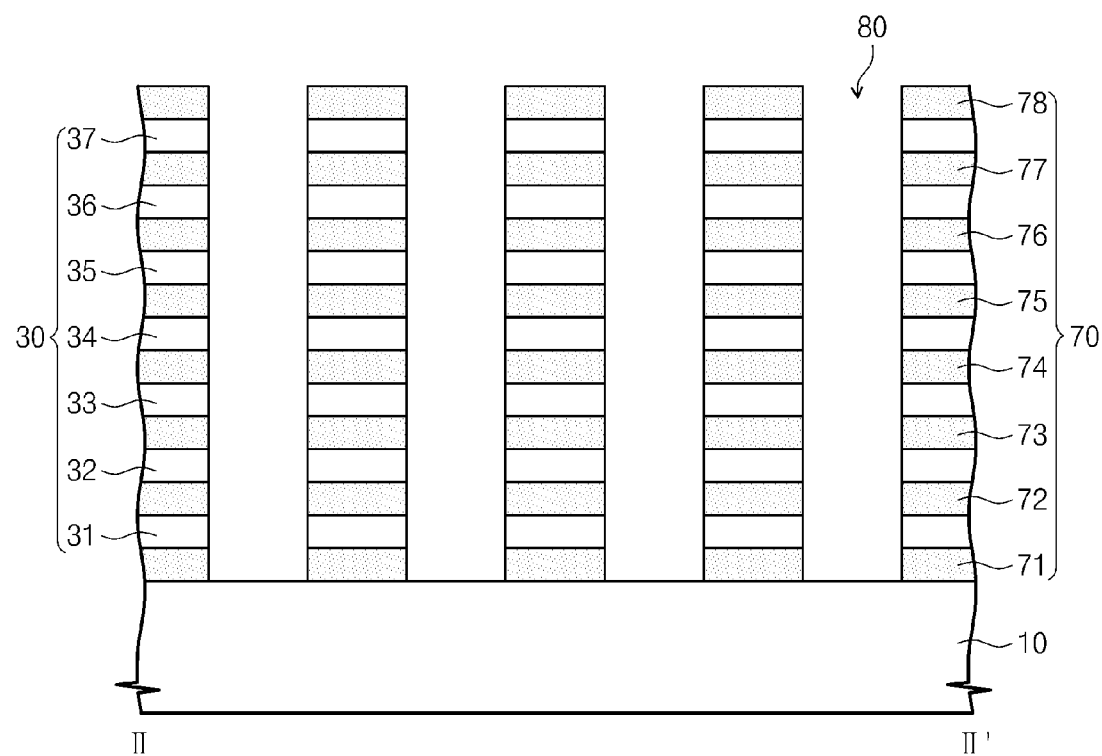

Referring to FIG. 8E, the conductive layers 70 and the dielectric layers 30 are removed vertical to the substrate 10, thereby forming holes 80 to expose the substrate 10. The conductive layers 70 and the dielectric layers 30 may be removed by focused ion beam or a reactive ion etching method.

Accordingly, the method of manufacturing the meta material according to the second embodiment of the present invention may repeatedly form at least one hole 80 in a parallel direction to the substrate 10 as the conductive layer 70 and the dielectric layers 30 stacked alternately on the substrate 10 are removed.

As mentioned above, according to exemplary configurations of the present invention, concentric rings comprising graphene having a higher conductivity than a metal element are comprised, propagation loss of an electromagnetic wave may be reduced.

Additionally, since magnetic resonance frequency is adjusted according to a horizontal distance between concentric rings or holes, a large area may be realized.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of manufacturing a meta material, the method comprising:
   preparing a substrate;
   forming at least one conductive nano pattern having a negative refractive index on the substrate; and
   forming a dielectric layer on the conductive nano patterns having a concentric ring shape,
   wherein the conductive nano patterns are formed using a copolymerization soft patterning method, and
   wherein the copolymerization soft patterning method comprises:
   forming a block copolymer on the substrate;
   forming a photoresist pattern exposing the block copolymer;
   selectively exposing the substrate using a self-assembly method of the block copolymer; and
   forming the concentric ring shape with a graphene or a graphene oxide on the exposed substrate.

2. The method of claim 1, wherein the conductive nano patterns comprise the graphene formed using a chemical vapor deposition method or the graphene oxide formed using a graphite oxidation-reduction method.

3. The method of claim 1, wherein the block copolymer is polystyrene(PS)-random-polymethylmethacrylate(PMMA) comprising PS and PMMA.

4. The method of claim 3, wherein the self-assembly method of the block copolymer comprises:
   arranging the PS and the PMMA of the block copolymer on the substrate, with the concentric ring shape; and
   exposing the substrate by removing the PMMA of the block copolymer.

* * * * *